US012724672B1

(12) United States Patent
Mei et al.

(10) Patent No.: US 12,724,672 B1
(45) Date of Patent: Sep. 1, 2026

(54) NODE POOL CYCLING WITH BOOT VOLUME REPLACEMENT

(71) Applicant: Oracle International Corporation, Redwood Shores, CA (US)

(72) Inventors: Guilin Mei, Bellevue, WA (US); Bhagyashree Shetty, Seattle, WA (US); Venkata Vasishta Chemudupati, Issaquah, WA (US); Mickey Rocket Boxell, Chicago, IL (US); Tanya Bansal, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/090,315

(22) Filed: Mar. 25, 2025

(51) Int. Cl.
*G06F 11/14* (2026.01)
*G06F 11/07* (2006.01)
*G06F 11/16* (2006.01)

(52) U.S. Cl.
CPC ...... *G06F 11/1425* (2013.01); *G06F 11/0709* (2013.01); *G06F 11/1612* (2013.01); *G06F 11/1662* (2013.01)

(58) Field of Classification Search
CPC ............. G06F 11/0709; G06F 11/1425; G06F 11/1612; G06F 11/1662; G06F 9/4403; G06F 9/44505
See application file for complete search history.

(56) References Cited

U.S. PATENT DOCUMENTS

| | | | | |
|---|---|---|---|---|
| 2021/0406035 | A1 * | 12/2021 | Price | G06F 11/3055 |
| 2024/0070012 | A1 * | 2/2024 | Baldassarre | G06F 11/2025 |
| 2025/0284513 | A1 * | 9/2025 | Horwitz | H04L 67/10 |

* cited by examiner

*Primary Examiner* — Michael Maskulinski
(74) *Attorney, Agent, or Firm* — Kilpatrick Townsend & Stockton LLP

(57) ABSTRACT

Techniques include receiving, from a data store, a first request that comprises a node identifier identifying a node and indicating that a configuration of the node is to be updated to an updated configuration. The techniques include determining whether the configuration is different from the updated configuration. In accordance with determining the configuration is different: requesting the node be cordoned, requesting the node be drained, requesting to replace a boot volume of the node, associating the updated configuration with the node, and requesting the node be uncordoned. The techniques further including transmitting a status indicator to the data store to indicate that the first request was successful.

20 Claims, 11 Drawing Sheets

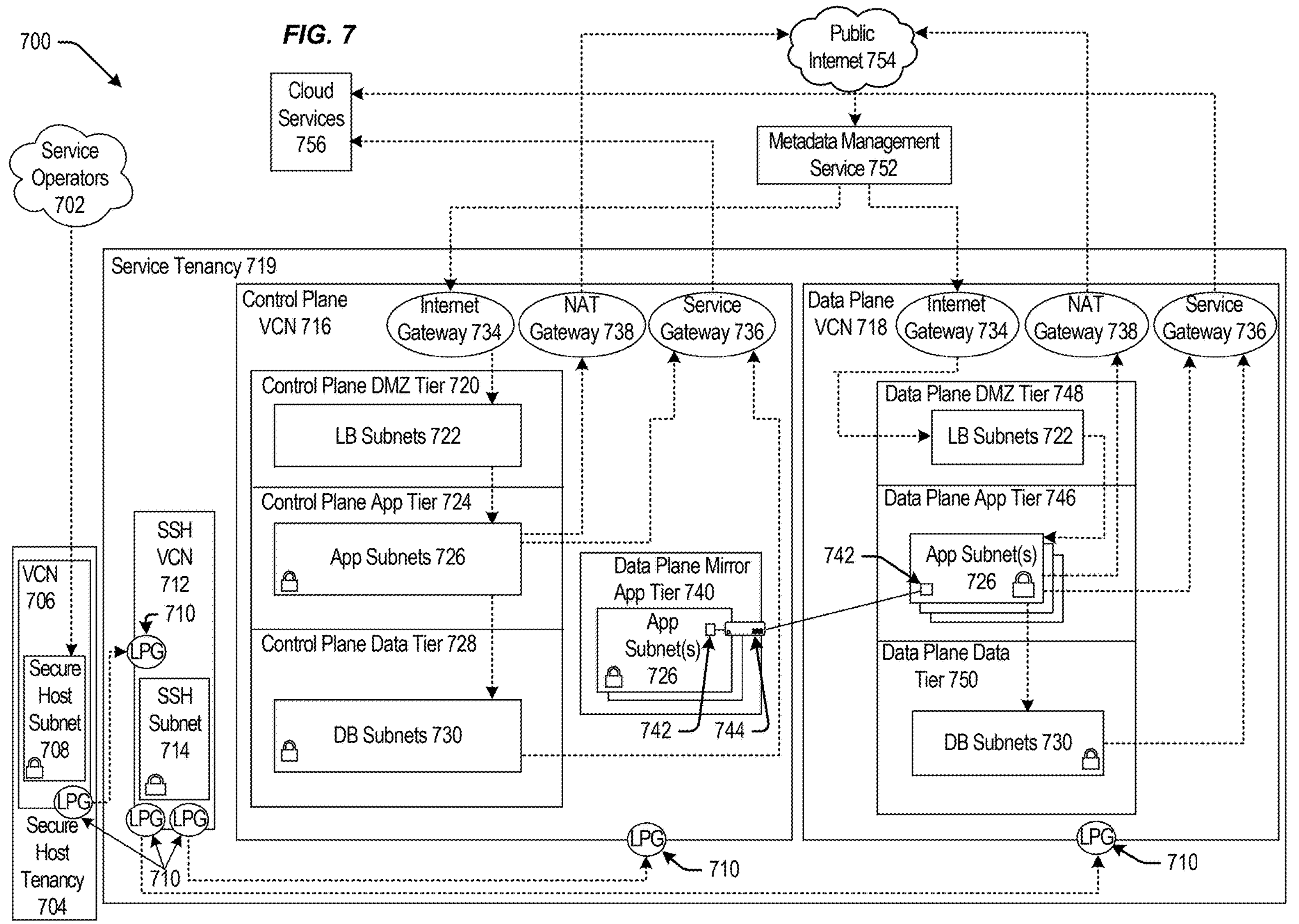

FIG. 7
700
Service Operators 702
Cloud Services 756
Public Internet 754
Metadata Management Service 752
Service Tenancy 719
Control Plane VCN 716
Internet Gateway 734
NAT Gateway 738
Service Gateway 736
Control Plane DMZ Tier 720
LB Subnets 722
Control Plane App Tier 724
App Subnets 726
Control Plane Data Tier 728
DB Subnets 730
Data Plane Mirror App Tier 740
App Subnet(s) 726
742
744
Data Plane VCN 718
Internet Gateway 734
NAT Gateway 738
Service Gateway 736
Data Plane DMZ Tier 748
LB Subnets 722
Data Plane App Tier 746
App Subnet(s) 726
742
Data Plane Data Tier 750
DB Subnets 730
LPG
710
SSH VCN 712
SSH Subnet 714
VCN 706
Secure Host Subnet 708
Secure Host Tenancy 704

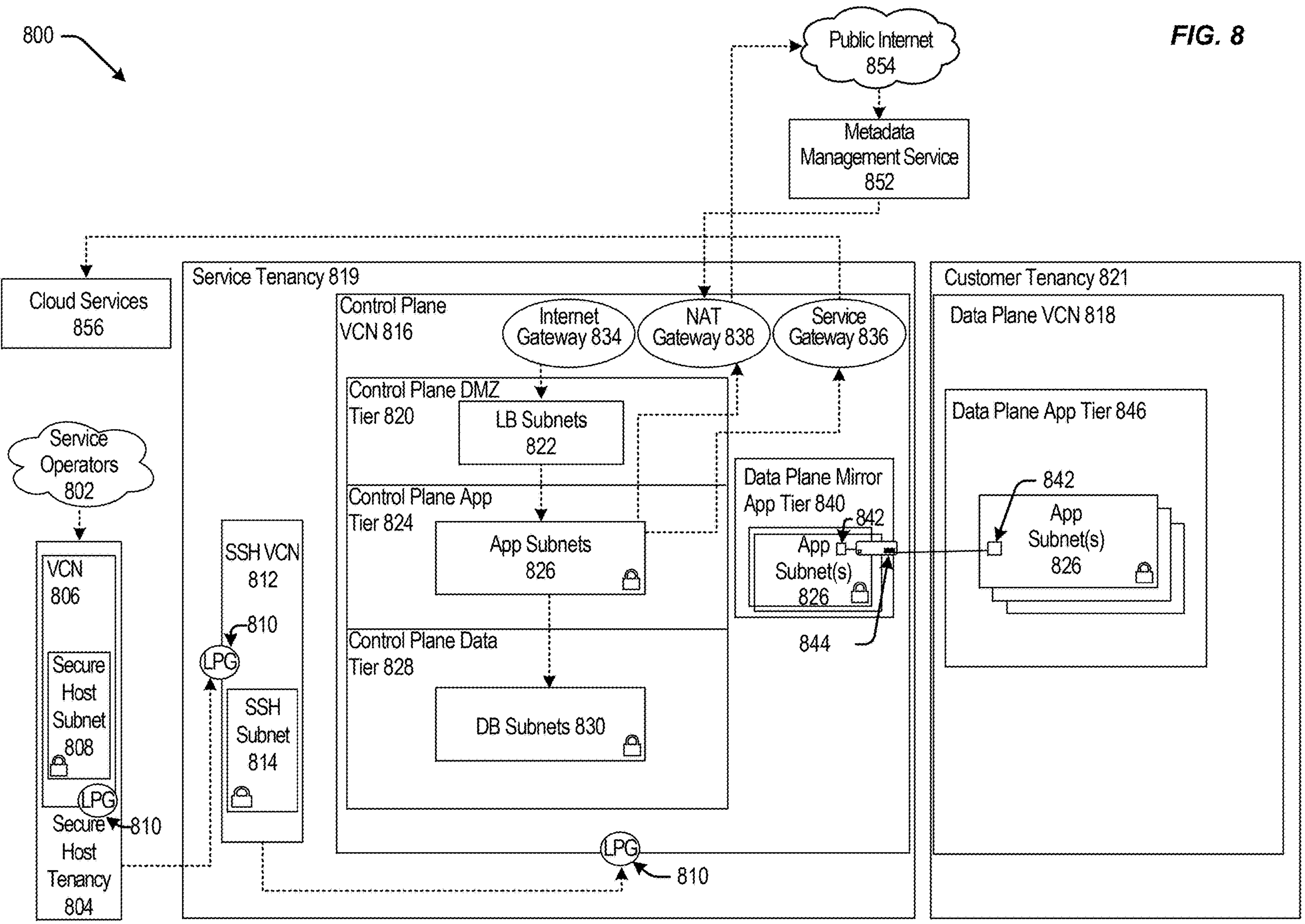
FIG. 8
800
Public Internet 854
Metadata Management Service 852
Cloud Services 856
Service Operators 802
VCN 806
Secure Host Subnet 808
LPG
810
Secure Host Tenancy 804
Service Tenancy 819
SSH VCN 812
SSH Subnet 814
Control Plane VCN 816
Internet Gateway 834
NAT Gateway 838
Service Gateway 836
Control Plane DMZ Tier 820
LB Subnets 822
Control Plane App Tier 824
App Subnets 826
Control Plane Data Tier 828
DB Subnets 830
Data Plane Mirror App Tier 840
App Subnet(s) 826
842
844
Customer Tenancy 821
Data Plane VCN 818
Data Plane App Tier 846

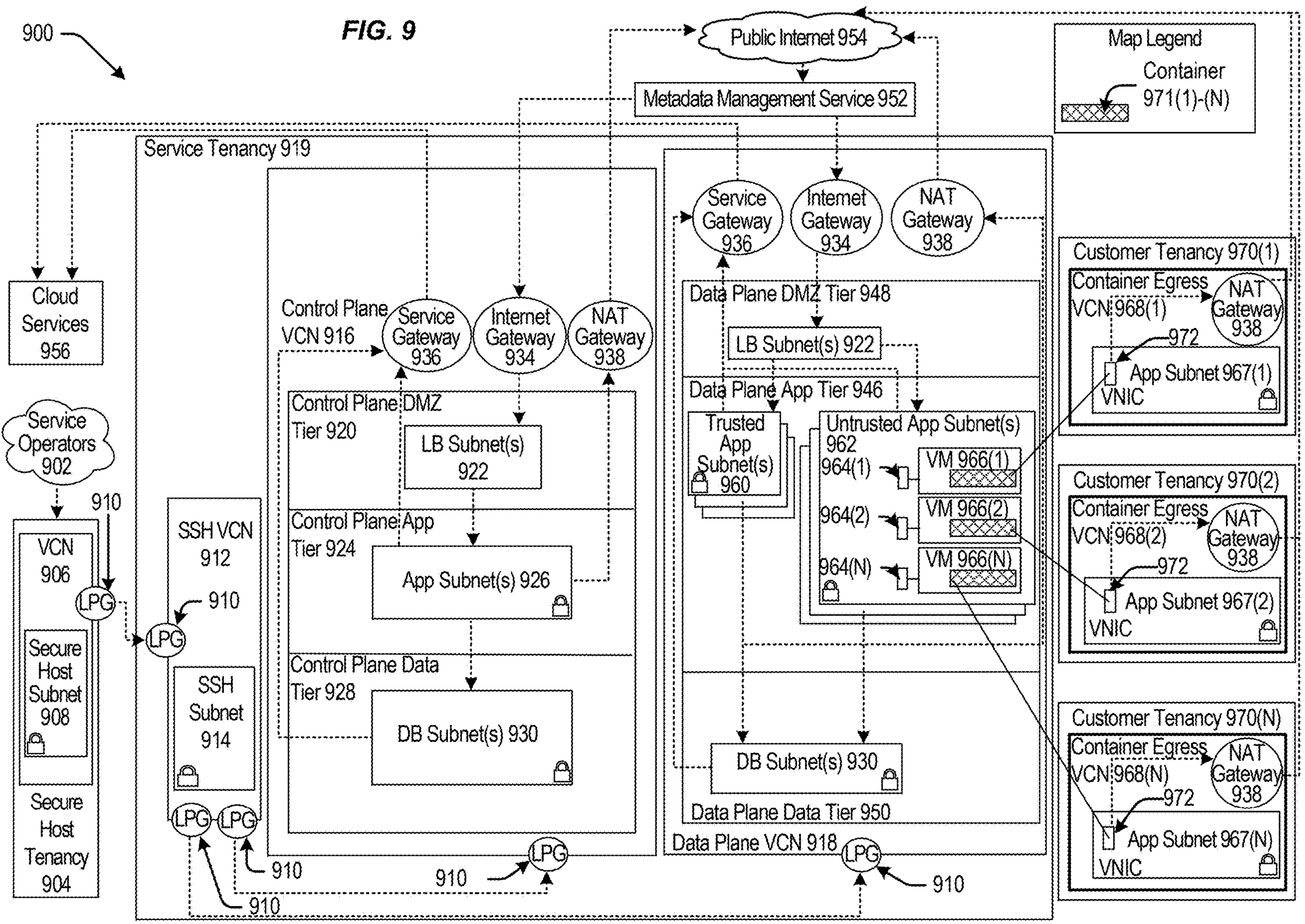
FIG. 9
900
Public Internet 954
Metadata Management Service 952
Map Legend
Container 971(1)-(N)
Cloud Services 956
Service Operators 902
VCN 906
Secure Host Subnet 908
Secure Host Tenancy 904
LPG
910
Service Tenancy 919
SSH VCN 912
SSH Subnet 914
Control Plane VCN 916
Service Gateway 936
Internet Gateway 934
NAT Gateway 938
Control Plane DMZ Tier 920
LB Subnet(s) 922
Control Plane App Tier 924
App Subnet(s) 926
Control Plane Data Tier 928
DB Subnet(s) 930
Data Plane DMZ Tier 948
Data Plane App Tier 946
Trusted App Subnet(s) 960
Untrusted App Subnet(s) 962
964(1)
964(2)
964(N)
VM 966(1)
VM 966(2)
VM 966(N)
Data Plane Data Tier 950
Data Plane VCN 918
Customer Tenancy 970(1)
Container Egress VCN 968(1)
Customer Tenancy 970(2)
Container Egress VCN 968(2)
Customer Tenancy 970(N)
Container Egress VCN 968(N)
972
App Subnet 967(1)
App Subnet 967(2)
App Subnet 967(N)
VNIC

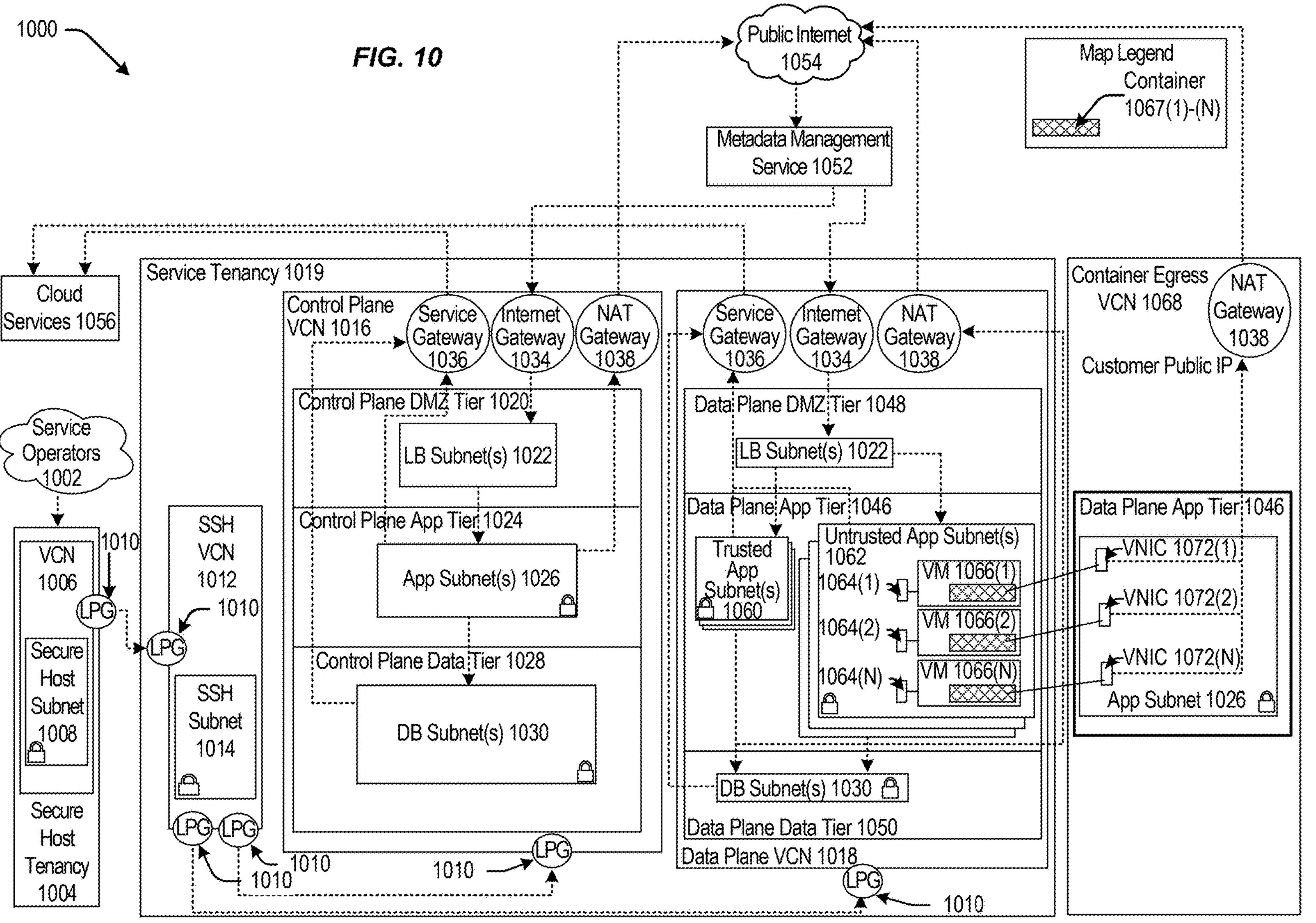

1000
FIG. 10
Public Internet 1054
Metadata Management Service 1052
Map Legend
Container 1067(1)-(N)
Cloud Services 1056
Service Tenancy 1019
Control Plane VCN 1016
Service Gateway 1036
Internet Gateway 1034
NAT Gateway 1038
Control Plane DMZ Tier 1020
LB Subnet(s) 1022
Control Plane App Tier 1024
App Subnet(s) 1026
Control Plane Data Tier 1028
DB Subnet(s) 1030
Service Gateway 1036
Internet Gateway 1034
NAT Gateway 1038
Data Plane DMZ Tier 1048
LB Subnet(s) 1022
Data Plane App Tier 1046
Trusted App Subnet(s) 1060
Untrusted App Subnet(s) 1062
1064(1)
1064(2)
1064(N)
VM 1066(1)
VM 1066(2)
VM 1066(N)
DB Subnet(s) 1030
Data Plane Data Tier 1050
Data Plane VCN 1018
Container Egress VCN 1068
NAT Gateway 1038
Customer Public IP
Data Plane App Tier 1046
VNIC 1072(1)
VNIC 1072(2)
VNIC 1072(N)
App Subnet 1026
Service Operators 1002
VCN 1006
Secure Host Subnet 1008
Secure Host Tenancy 1004
SSH VCN 1012
SSH Subnet 1014
LPG
1010

NODE POOL CYCLING WITH BOOT VOLUME REPLACEMENT

BACKGROUND

Cluster architectures can allow for scalable deployment of computing resources. The cluster can allocate containerized workloads to nodes within the cluster, and the cluster can provide the nodes with the appropriate resources for executing the workload. Sometimes a node malfunctions and needs repairing or a node needs to be updated. Improvements to processes for maintaining nodes are desirable.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, techniques may include receiving, by a node operation controller and from a data store, a first request that comprises a node identifier identifying a node executing as part of one or more containerized applications, wherein the first request is indicates that a configuration of the node is to be updated to an updated configuration. The techniques may further include determining, by the node operation controller, whether the configuration is different from the updated configuration. In accordance with determining the configuration is different, the techniques may further include transmitting, by the node operation controller, a second request including the node identifier and requesting the node be cordoned to an application programming interface (API) server. In accordance with determining the configuration is different, the techniques may further include transmitting, by the node operation controller, a third request comprising the node identifier and requesting node be drained to the API server. In accordance with determining the configuration is different, the techniques may further include transmitting, by the node operation controller, a fourth request to replace a boot volume of the node to a compute service. In accordance with determining the configuration is different, the techniques may further include associating, by the node operation controller, the updated configuration with the node. In accordance with receiving a response from the compute service based at least in part on the fourth request, the techniques may further include transmitting, by the node operation controller, a fifth request comprising the node identifier and requesting the node be uncordoned to the API server. The techniques may further include transmitting, by the node operation controller, a status indicator to the data store to indicate that the first request was successful.

Implementations of the described techniques may include hardware, a method or process, or a non-transitory computer tangible medium.

BRIEF DESCRIPTION OF THE DRAWINGS

FIG. 7 is a block diagram illustrating one pattern for implementing a cloud infrastructure as a service system, according to at least one embodiment.

FIG. 8 is a block diagram illustrating another pattern for implementing a cloud infrastructure as a service system, according to at least one embodiment.

FIG. 9 is a block diagram illustrating another pattern for implementing a cloud infrastructure as a service system, according to at least one embodiment.

FIG. 10 is a block diagram illustrating another pattern for implementing a cloud infrastructure as a service system, according to at least one embodiment.

DETAILED DESCRIPTION

Figure 1:
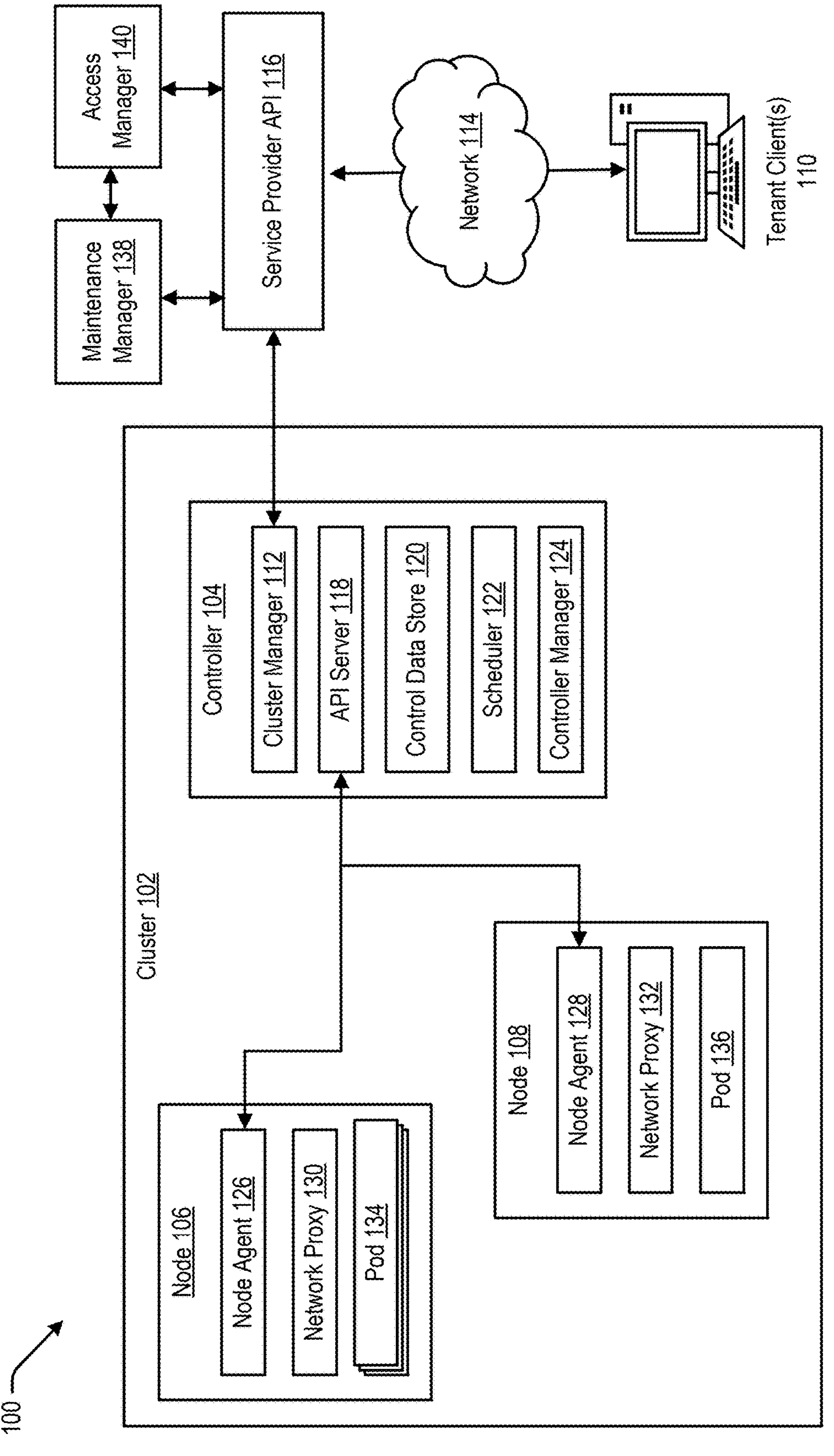
FIG. 1 shows a simplified diagram of a node maintenance system, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A cloud service provider may operate a cloud service provider infrastructure. The cloud service provider may offer a container service (e.g., a Kubernetes service) to use for managing and scaling containerized applications. A tenant (e.g., a customer) of the cloud service provider who uses the cloud service provider infrastructure to use the container service may run workloads on large container clusters with many nodes (e.g., thousands of nodes). Tenants can encounter hardware and/or software issues on the nodes, which can slow down the application running on the nodes. Additionally, or alternatively, tenants may want to perform node maintenance including updating a configuration of a node by using a tenant client. Tenants are often responsible for managing the nodes (e.g., computer instances where Kubernetes workloads run). One maintenance task may include updating the OS image that's running on those nodes for security compliance purposes, updating the container version, and/or rotating SSH keys.

Tenants may manage the nodes by terminating existing instances and replacing them with new nodes that include an update configuration. This approach to node cycling is vulnerable to capacity issues because replacing an entire node instance to update a configuration property parameter may be overkill. The capacity issues may not only exist for bare metal (BM) instances, but also for virtual machine (VM) instances. Moreover, managed node pools with BM instances may be explicitly prevented from node cycling by means of terminating and replacing instances (e.g., due to limited capacity of BM instances as well as the amount of time BM instance capacity is lost due to the time for a host provisioning service (HoPS) to make terminated BMs available for use again).

Embodiments herein describe techniques for performing in-place node updates that can be capable of updating a current configuration of a node with a requested node configuration using a boot volume replacement and without terminating and replacing existing instances. The techniques can provide advantages compared to previous techniques used to update a node configurations. For example, the techniques may enable security patching, version upgrades, and other configuration changes to occur more often because the process for the node configuration update may take less time. Since the techniques can allow the process of updating a node to be performed more often, security can be improved since software patches and version upgrades may be applied more frequently. Additionally, since the techniques use a node operation controller to handle performance of the maintenance, network traffic from tenant clients can be reduces and errors that could otherwise be made by the tenant client to perform the configuration updates may be reduced or eliminated. By reducing network traffic and errors, resource usage (e.g., energy resources, network resources, and/or computational resource) of the system can be reduced due to the techniques described herein. These embodiments and improvements, along with others, are described herein in further detail.

FIG. 1 shows a simplified diagram of a node maintenance system 100, according to at least one embodiment. The node maintenance system 100 may include one or more tenant clients 110, a network 114, a service provider application programming interface (API) 116, a maintenance manager 138, an access manager 140, and a cluster 102. The controller may include a cluster manager 112, an API server 188, a control data store 120, a scheduler 122, and/or a controller manager 124. Cluster 102 can include a controller 104 and one or more nodes (e.g., node 106 and node 108). The controller 104 and the one or more nodes 106 and 108 are computing devices, and, while two nodes are shown in node maintenance system 100, one or more nodes may be included in the cluster 102.

The cluster 102 can receive a node maintenance request from the tenant clients 110 at the cluster manager 112. The node maintenance request can include a cluster identifier to identify a cluster to update, a node pool identifier to identify one or more nodes to update, a node identifier to identify a node to update, a cycle mode indication, a scope, and/or a node configuration update. The cycle mode indication may indicate a boot volume replace cycle mode or a instance replace cycle mode. The boot volume replace cycle mode can cause node cycling (e.g., node configuration updated) to occur in place without deleting the nodes. The instance replace cycle mode can cause nodes to be deleted and then recreated (e.g., recreated with an updated configuration). The scope may indicate what all nodes or a subset of nodes in the identified node pool or the identified cluster are the target of the node maintenance request. The scope may indicate whether nodes that do not match an expected node state should be updated or whether all nodes should be updated. The node configuration update may include a node configuration (e.g., a YAML file) or may include an update to one or more properties and/or parameters of a node configuration file. The node configuration update may indicate a property (e.g., a Kubernetes version) of a node to be updated and a parameter value (e.g., a Kubernetes version number) to update the node configuration property to.

The node maintenance request can be received at the cluster manager 112 via a network 114 and the service provider API 116. The service provider API 116 may determine to transmit the node maintenance request to the cluster manager 112 based on the cluster identifier included in the node maintenance request (e.g., the cluster identifier may identify cluster 102), the node identifier, and/or the node pool identifier. The network 114 can be any appropriate network such as the internet. The cluster manager 112 can include a mapping of resources to identities (e.g., tenant identifier, cluster identifier, node identifiers, etc.) in some embodiments. The cluster manager 112 may compare a node maintenance request against one or more permissions to determine if the requesting tenant client 110 has permission to perform the requested action with respect to the resource mapped to the client identifier of the tenant client 110. A cluster configuration can include the number of nodes, the shape of the nodes (e.g., the computing resources that are assigned to each node), the attached resources for each node, etc.

The node maintenance request may be transmitted to the maintenance manager 138 by the service provider API 116 to determine whether to transmit the node maintenance request to the cluster manager 112. In certain embodiments, in response to the node maintenance request, the cluster manager 112 may send the node maintenance request to maintenance manager 138 of the service provider (e.g., via service provider API 116). The maintenance manager 138 may query the access manager 140 to determine if an identifier included in the node maintenance request (e.g., the tenant client identifier) from the node maintenance request has permission to perform the operations associated with the node maintenance request (e.g., associated with the cluster, node, pods, etc. identified by the node maintenance request). The maintenance manager 138 can indicate whether access to the identified resource is granted and transmit the indication to the cluster manager 112 and/or to the tenant client 110.

The cluster manager 112 can communicate with the nodes 106-108 via an API server 118. For example, the node maintenance request may be transmitted from the controller 104 to the nodes 106-108 via the API server 118. The API server 118 may validate requests, process the requests, and update the control data store 120. The instructions, and any other data for cluster 102 can be stored to control data store 120. The stored data can include any scheduled workloads (e.g., node maintenance requests), the results of any workloads (e.g., a status of a node maintenance request), permissions for the cluster 102, identities, etc. Workloads can be allocated to the nodes 106-108 by the scheduler 122. The state for the nodes, including the shape for each node and any attached resources, can be managed by the controller manager 124.

The nodes 106 and 108 may include a node configuration. The node configuration may be stored as a YAML file. The node configuration can include properties and parameters applied to the node (e.g., a physical or virtual machine) within the cluster 102, defining the node's available resources like CPU, memory, storage, and other operational aspects like networking and container runtime settings, essentially customizing how that node functions within the cluster to best suit workload needs. The configuration file may include the following properties but is not limited to the following properties: a version property (e.g., a kubernetes Version property), a node Meta data property, a boot volume size in Gigabytes (GBs) property, an image identifier property, and/or a SSH public key property. The properties may be associated with a respective parameter (e.g., a value). For example, a parameter associated with the version property may be "1.0" to indicate a version number.

The controller manager 124 can manage controllers that monitor the cluster 102 and take action when an actual state does not match an expected state. Controllers that the controller manager 124 may manage include, but are not limited to, a node controller that monitors worker nodes and replaces failing ones, a replication controller that ensures the correct number of pod replicas are running, an endpoint controller that manages services and their associated pods, a node action controller that monitors the control data store 120 for node maintenance request to cause the node operation controller to manage the node (e.g., cordon, drain, and/or uncordon, etc.), and/or to cause a node operation controller to manage the node and/or manage compute used by the node. The controller manager 124 may access an expected state for each node 106-108 via the cluster manager 112 or from the control data store 120. The controller manager 124 can monitor the actual state of the nodes 106-108 via the API server 118, and the controller manager 124 can change the actual state of the nodes 106-108 if the actual and expected state differ.

The control data store 120 may store a state of the cluster 102 and the configuration of the cluster 102. The control data store 120 may include a key value store (e.g., a distributed key-value store) that is used to persist cluster 102 data.

The nodes 106-108 and controller 104 can communicate via node agents (e.g., node agents 126 and 128). In some embodiments, the communication can occur via network proxies (e.g., network proxies 130 and 132). The node agents 126 and 128 can change the state of each node, attach or remove computing resources from each node, and assign workloads to each node. A workload can be deployed in a group of one or more containers called a pod. Nodes can have one or more pods (e.g., pod(s) 134 and 136) that are executing on the respective node simultaneously. Pods 134 and 136 can correspond to one or more workloads that are scheduled to be executed on the same computing device in a shared context. The context can include common namespaces, control groups, and computing resources for the one or more workloads within the pod. A workload may be generated based on a node maintenance request.

Figure 2:
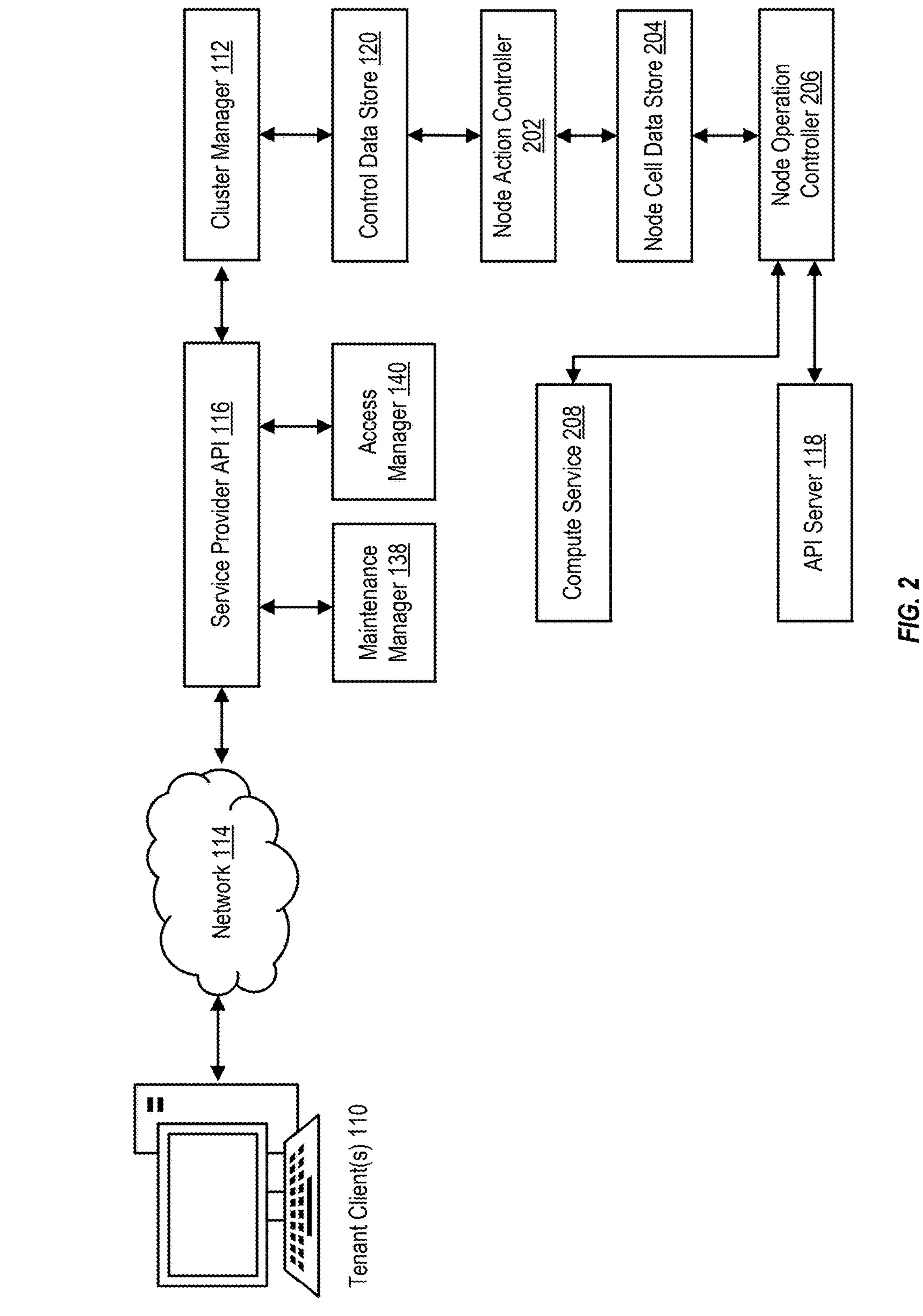
FIG. 2 shows a simplified diagram of a node maintenance system, according to at least one embodiment.

FIG. 2 shows a simplified diagram of a node maintenance system 200, according to at least one embodiment. The node maintenance system 200 may be the node maintenance system 100 described above with respect to FIG. 1. The node maintenance system 200 may include one or more tenant clients 110 (e.g., tenant clients 110 described above with respect to FIG. 1), a network 114 (e.g., network 114 described above with respect to FIG. 1), a service provider API 116 (e.g., service provider API 116 described above with respect to FIG. 1), a maintenance manager 138 (e.g., maintenance manager 138 described above with respect to FIG. 1), an access manager 140 (e.g., access manager 140 described above with respect to FIG. 1), a cluster manager 112 (e.g., cluster manager 112 described above with respect to FIG. 1), a control data store 120 (e.g., control data store 120 described above with respect to FIG. 1), a node action controller 202, a node cell data store 204, a node operation controller 206, an API server 118, (e.g., API server 118 described above with respect to FIG. 1), and a compute service 208.

The control data store 120 may store node maintenance requests or a portion of a node maintenance request received from the cluster manager 112. The node maintenance request may include an identifier of the tenant client 110 the node action maintenance request was received from. The node maintenance request may include an indication of node maintenance to be performed (e.g., a boot volume replacement, a reboot, etc.). The node maintenance request can include a cluster identifier to identify a cluster to update, a node pool identifier to identify one or more nodes to update, a node identifier to identify a node to update, a cycle mode indication, a scope, and/or a requested node configuration.

The node maintenance request may include an indication of the node (e.g., a node identifier, a compute instance identifier) and/or the cluster (e.g., a cluster identifier) the node maintenance should be performed on. The node maintenance requests may be stored in the control data store 120 by the cluster manager 112 and be associated with a node maintenance request status and an identifier of the node maintenance request. The node maintenance request status may indicate whether the node action controller 202 has transmitted a node action request based on the node maintenance request. The node maintenance request status may indicate a result (e.g., that the node maintenance was performed successfully, that the node maintenance has not been performed yet, that the node maintenance is queued, and/or that the node maintenance could not be performed, etc.) of a node action request transmitted by the node action controller 202 based on the node maintenance request. The identifier of the node maintenance request may be generated to uniquely identify the node maintenance request from other node maintenance requests stored by the control data store 120. The node maintenance requests may have been received from the tenant client 110 via the network 114, service provider API 116, and/or the cluster manager 112.

In certain embodiments, the maintenance manager 138 may perform validation for the node maintenance request (e.g., before the node maintenance request is stored by the control data store 120, before the node action controller 202 generates a node action request based on the node maintenance request). The validation may include validating the tenant identifier associated with the node maintenance request is on an allow list for the node maintenance request, validating the cluster identifier is an enhanced cluster (e.g., a cluster that supports receiving the node maintenance request), and/or validating the node identifier included in the node maintenance request is in a format that can be used by node maintenance system 200. Other validations may include validating that the cluster is not in a terminated or terminating state, validating the node cluster is associated with compute controlled by compute service 208, and/or validating there are no other node actions being performed to a node identified by the node maintenance request.

The node action controller 202 may be managed by a controller manager (e.g., controller manager 124 described above). The node action controller 202 may follow a controller-commons with sharding model and registers itself as a listener to the control data store 120. In certain embodiments, the node action controller 202 registers itself as a listener to a bucket of the control data store 120 that includes node maintenance requests (e.g., node actions). The node action controller 202 may find the node maintenance request through searching for entries included in the control data store 120. The node action controller 202 may search for entries, entries associated with a certain node, entries with a specific status, and/or entries with a certain node maintenance request identifier. When the node action controller 202 is informed (e.g., via listening) that there is a node maintenance request added to the control data store 120, node action controller 202 may generate and transmit a node action request to the node cell data store 204 based on the node maintenance request. The node action request may include the information or a portion of the information included in the node maintenance request.

The node cell data store 204 may be one of a plurality of node cell data stores. The node cell data store 204 that the node action request is transmitted to may be determined based on the indication of the node included in the node maintenance request. The node action controller 202 may be associated with the node and be configured to monitor the control data store 120 for maintenance requests associated with the node.

The node cell data store 204 may store the node action request. The node action request may be stored in association with a node action request identifier. The node action request identifier may be the node maintenance request identifier or be associated with the node maintenance request identifier. In certain embodiments, the node action request identifier may be generated to uniquely identify the node action request from other node action requests stored by the node cell data store 204. The node action request may be stored in association with a node action request status. The node action request status may indicate a status of the node action request. The node action request status may indicate whether the node operation controller 206 has transmitted a node operation request based on the node action request. The status of the node action request may indicate a node operation request result (e.g., that the node action was performed successfully, that the node action is being performed, that the node action has not been performed yet, that the node action is queued, and/or that the node action could not be performed, etc.) of a node operation request transmitted by the node operation controller 206 to the API server 118. The status of the node action request may indicate a compute operation request result (e.g., that the node action was performed successfully, that the node action is being performed, that the node action has not been performed yet, that the node action is queued, and/or that the node action could not be performed, etc.) of a compute operation request transmitted by the node operation controller 206 to the compute service 208.

The node operation controller 206 may be managed by a controller manager (e.g., controller manager 124 described above). The node operation controller 206 may register itself as a listener to the node cell data store 204. In certain embodiments, the node operation controller 206 registers itself as a listener to a bucket of the node cell data store 204 that includes node operation requests. When the node operation controller 206 is informed (e.g., via listening) that there is a node action request added to the node cell data store 204, node operation controller 206 may generate and transmit a node operation request to the API server 118. The node operation request may include the information included in the node action request or a subset of the information included in the node action request. The node operation request may include the node identifier identified by the node maintenance request and an operation to be performed. The operation may include a cordon operation, a drain operation, and/or an uncordon operation.

When the node operation controller 206 is informed (e.g., via listening) that there is a node action request added to the node cell data store 204, node operation controller 206 may generate and transmit the compute operation request to the compute service 208. The compute operation request may include the information included in the node action request or a subset of the information included in the node action request. The compute request may include the node identifier identified by the node maintenance request, a request to perform a boot volume replacement on the identifier node, and/or the requested node configuration for the node.

The API server 118 is described in further detail above and may include a container API including a Kubernetes API. Interactions with the cluster (e.g., creating pods, scaling deployments, etc.) may go through the API server 118. The API server 118 may validate requests (e.g., node operation requests), process the node operation requests, and update the control data store 120 (e.g., an etcd database).

The compute service 208 may manage cloud provider-specific integrations. The compute service 208 may manage load balancers, persistent storage, and/or node lifecycles (e.g., detecting when a cloud instance is terminated).

The node operation controller 206 may receive an indication from the API server 118 after the API server 118 receives, is completing, has completed, and/or has failed to complete, etc. the node operation request. The node operation controller 206 may receive an indication from the compute service 208 after the compute service 208 receives, is completing, has completed, and/or has failed to complete, etc. the compute operation request.

The node operation controller 206 may update the node action request status stored by the node cell data store 204 based on the indication from the API server 118 and/or the indication from the compute service 208. The node action request status update may indicate whether the request was carried out successfully or not, an error occurred, which error occurred, etc.

The node action controller 202 may poll (e.g., periodically) the node cell data store 204 to check the node action request status stored by the node cell data store 204. The node action controller 202 may update the status of the node maintenance request status stored by the control data store 120 based on the status of the node action request status. The node action controller 202 may update one or more buckets stored by the control data store 120 (e.g., a NodeAction bucket, a WorkRequest bucket, a node state bucket). The WorkRequest bucket (e.g., a node maintenance request status bucket) may be used to report progress of the node maintenance requests. The node state bucket may be used to keep a consistent view from node level and node pool level (e.g., whether a node is terminated, has joined the cluster, etc.).

In certain embodiments, the node maintenance request entry stored by the control data store 120 and associated with the node maintenance request status is deleted from the control data store 120 after the request is completed. In certain embodiments, the action request entry stored by the node cell data store 204 and associated with the node action request status is deleted from the node cell data store 204 after the node action request is completed. In certain embodiments, the node action controller 202 and/or the node operation controller 206 updates the state of a node associated with the node identifier associated with the node action request and/or node operation request.

In certain embodiments, a node maintenance request may be canceled. The node maintenance request may be canceled based on a cancel request received from the tenant client 110. In embodiments that support canceling a node maintenance request, the cluster manager 112 may update a corresponding node maintenance request status to a canceled status. The control data store 120 may remove the entry from the control data store 120 if the node maintenance request status is changed to canceled. If the node action controller 202 has already generated and transmitted a node action request based on the node maintenance request (e.g., as indicated by a status associated with the node maintenance request and/or and identifier included in the node cell data store 204), the status of the node action request may be updated to a canceled state in the node cell data store 204 to cause the node action request to be canceled (e.g., removing the node action request from the node cell data store 204). If the node operation controller 206 has already generated and transmitted a node operation request based on the node action request and/or a node compute request, a cancel request may be transmitted to the computer service and/or the API server 118 to cancel the request(s).

In certain embodiments, the node maintenance request status is changed to canceled and the above-described canceling actions are performed to cancel the node maintenance request if the state of a node has been in a terminal state for more than a predefined period of time (e.g., 20 minutes) because of a timeout.

Figure 3:
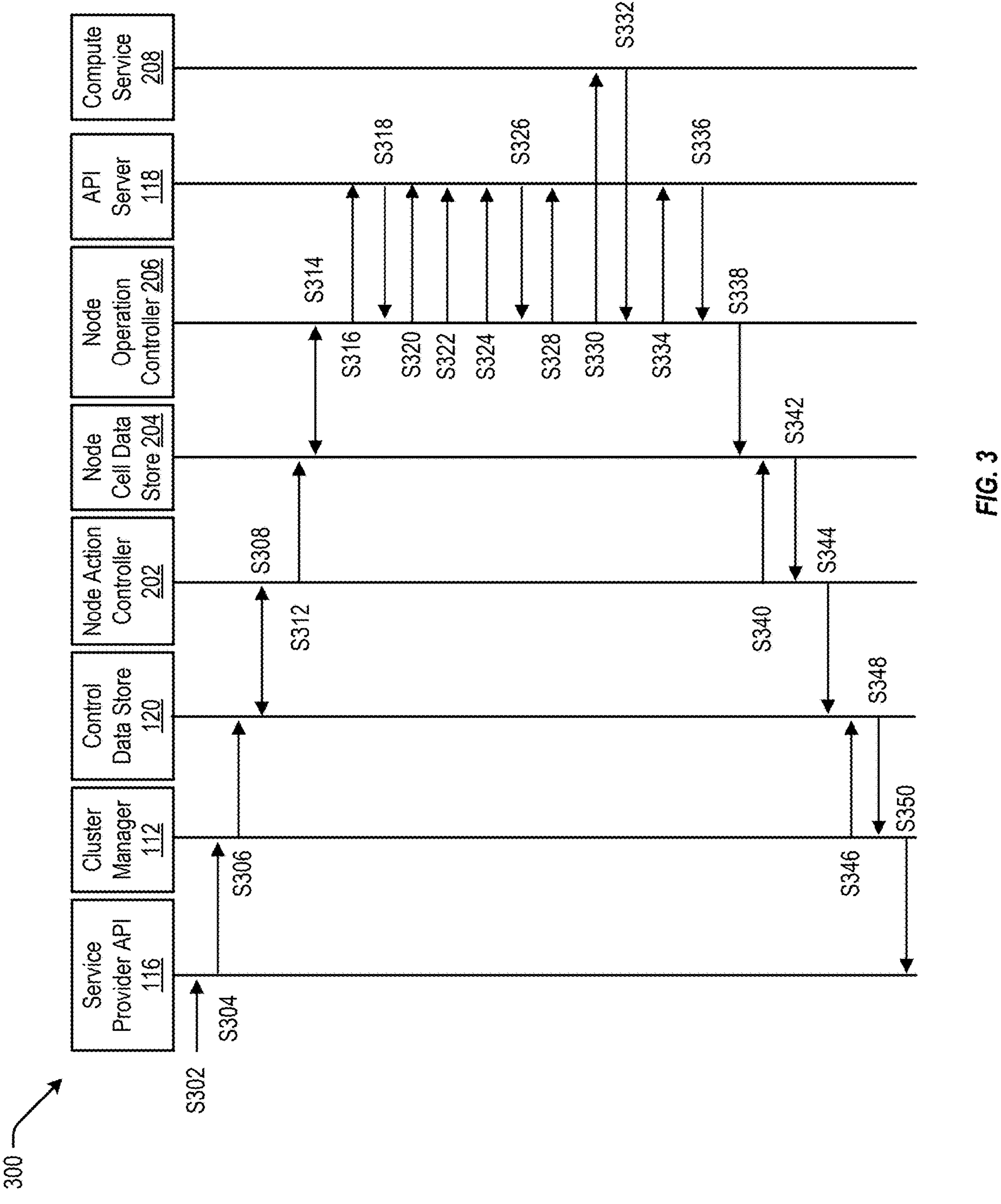
FIG. 3 shows a simplified flow diagram for processing performed by a node maintenance system, according to various embodiments.

FIG. 3 shows a simplified flow diagram 300 for processing performed by a node maintenance system (e.g., node maintenance system 100, node maintenance system 200), according to various embodiments. The node maintenance system may include a service provider API 116 (e.g., service provider API 116, described above with respect to FIG. 2), a cluster manager 112 (e.g., cluster manager 112 described above with respect to FIG. 2), a control data store 120 (e.g., control data store 120 described above with respect to FIG. 2), a node action controller 202 (e.g., node action controller 202 described above with respect to FIG. 2), a node cell data store 204 (e.g., node cell data store 204 described above with respect to FIG. 2), a node operation controller 206 (e.g., node operation controller 206 described above with respect to FIG. 2), an API server 118 (e.g., API server 118 described above with respect to FIG. 2), and a compute service 208 (e.g., compute service 208 described above with respect to FIG. 2). The process may be performed for one or more nodes (e.g., for an individual node, for a node pool).

At step S302, the service provider API 116 may receive a node maintenance request. The node maintenance request may have been received from the tenant client device (e.g., tenant client 110 described above) via the network 114. The node maintenance request may include a cluster identifier to identify a cluster to update, a node pool identifier to identify one or more nodes to update, a node identifier to identify a node to update, a cycle mode indication, a scope, and/or a requested node configuration. The node maintenance request may include a node eviction setting to cordon and/or drain the node to ensure no disruption to the workload during boot volume replacement.

At step S304, the service provider API 116 may transmit the node maintenance request to the cluster manager 112. In certain embodiments, the node maintenance request is received after the service provider API 116 uses a maintenance manager (e.g., maintenance manager 138 described above) and/or access manager (e.g., access manager 140 described above) to determine if the node maintenance request should be carried out. For example, the maintenance manager and/or the access manager may determine the node maintenance request was received from a tenant client or a device that has necessary cluster and compute instance permissions.

At step S306, the cluster manager 112 may transmit the node maintenance request to the control data store 120. The node maintenance request may be stored as an entry in a data structure maintained by the control data store 120. The control data store 120 may store the node maintenance requests as described above. In certain embodiments, the cluster manager 112 validates the node is part of the cluster and there is no other in-flight node action (e.g., no other node maintenance requests entries stored in the control data store 120 that are associated with the node) on the same node. Determining whether there is another in-flight node action on the same node may include querying the control data store 120 to determine a status of the node and/or to determine if a maintenance request associated with the node is stored by the control data store 120. Additionally, or alternatively, the cluster manager 112 may perform other validations before transmitting the maintenance request to the control data store 120. Validation may include determining the node exists in compute, determining the node is not terminated, the node belongs to the cluster, the node has not been marked to be deleted. Other validation techniques are described herein.

At step S308, the node action controller 202 may be monitoring the control data store 120 for new entries. The node action controller 202 may determine that step S306 was performed and determine that a node action request should be generated. The node action controller 202 may read and/or request the new node maintenance request entry from the control data store 120. The node action controller 202 may receive the node maintenance request entry from the control data store 120. In certain embodiments, node action controller 202 does not obtain the node maintenance request entry from the control data store 120 until one or more other node maintenance requests stored by the control data store 120 have been finished, canceled, and/or timed out.

At step S312, the node action controller 202 may generate the node action request based on the node maintenance request. The node action request may include at least a portion of the information included in the node maintenance request. The node action controller 202 may transmit the node action request to the node cell data store 204. In certain embodiments, node action controller 202 does not transmit the node action request to the node cell data store 204 until one or more other node action requests stored by the node cell data store 204 have been finished, canceled, and/or timed out.

At step S314, the node operation controller 206 may be monitoring the node cell data store 204 for new entries of node action requests. The node operation controller 206 may determine that step S312 was performed and determine that a node operation request should be generated. The node operation controller 206 may read and/or request the new node action request entry from the node cell data store 204. The node operation controller 206 may receive the new node action request entry from the node cell data store 204.

In certain embodiments, the node action controller may not transmit a node operation request associated with the node to the API server 118 and/or the compute service 208 until a status associated with another node operation request associated with the node indicates that the other node operation requests for the node has been completed or has stopped (e.g., other node pool level cycling operation may not be performed until the state is in a terminal state).

At step S316, the node operation controller 206 may request, via the API server 118, a current node configuration from the node identified by the node action request the node operation controller received from the node cell data store 204. The current node configuration and/or the requested node configuration may be represented by a configuration file (e.g., a YAML file). The node may store the configuration file.

At step S318, the API server may return the current node configuration associated with the node to the node operation controller 206. The node operation controller 206 can then determine whether the current node configuration is different from the requested node configuration.

The current node configuration may be compared with the requested node configuration included in the node action request (e.g., the requested configuration included in the node maintenance request. In certain embodiments, if the requested node configuration is different from the current node configuration, the process may continue to step S318. If the requested node configuration is the same as the current node configuration, then the process may not perform steps S318-S336 and return an indication at step S338 that the requested node configuration cannot be performed.

In certain embodiments, only certain portions (e.g., property-parameter pairs) are compared between the current node configuration and the requested node configuration. For example, only the assigned parameters to a Version property, a nodeMetadata property, a boot VolumeSizeInGBs property, an imageId property, and/or a sshPublicKey property of the current node configuration may be compared with the corresponding property-parameter pair of the requested node configuration to determine if the requested node configuration is different from the current node configuration. The other properties and parameter pairings included in the current node configuration and the requested node configuration may not be used to determine whether the configurations are different. The node operation controller 206 and/or the node may store the requested node configuration or cause the requested node configuration to be stored while the node is being operated on.

At step S320, the node operation controller 206 may generate and transmit a first node operation request to the API server 118. The first node operation request may request that the node is cordoned. The node operation controller 206 may wait for an indication that the node has been cordoned before performing step S322.

At step S322, the node operation controller 206 may generate and transmit a second node operation request to the API server 118. The second node operation request may request that the node is drained. The node operation controller 206 may wait for an indication that the node has been drained before performing further steps.

At step S324, the node operation controller 206 may generate and transmit a request to the API server 118 to request an eviction status of the node. The eviction status may indicate whether the cordon and/or drain operation has been successfully completed for the node. The request may be used to check whether the node is cordoned and all eligible pods are evicted. The node operation controller 206 may wait for eviction to be finished until an eviction grace period has elapsed. If eviction does not finish within the grace period, a fail cycling request may be transmitted by the node operation controller 206 to instruct the API server 118 to stop the cycling request. In certain embodiments, the node operation controller 206 may be configured to transmit a boot volume replace command after the grace period elapses if the eviction has not finished. In certain embodiments, the grace period may be defined by the node configuration and/or may be set by the node action request. The node action request may include a node grace period that was included in the node maintenance request. The grace period may be set to a value (e.g., zero) to cause no grace period to occur, causing a boot volume or reboot to occur without a cordon or drain operation first occurring.

At step S326, the API server 118 may transmit the requested eviction status to the node operation controller 206. The node operation controller 206 may determine to proceed to step S328 if the eviction status indicates that the node has been cordoned and drained.

In certain embodiments, the node operation controller 206 may use the eviction status from the API server 118 to update the node action request status stored by the node cell data store 204 (e.g., to indicate whether the work request has finished). The indication from the API server 118 may indicate whether the node operation request finished.

At step S328, a bootstrap token may be generated so the bootstrap token can be uploaded to the node. In certain embodiments, the bootstrap token is not generated and is instead the same bootstrap token that was previously associated with the node. The bootstrap token enable the node to rejoin the cluster identified by the cluster identifier. The bootstrap token may be generated independent of (e.g., without deleting) the node. The bootstrap token may be transmitted to the node (e.g., via the API server 118) before the node can rejoin the cluster.

At step S330, the node operation controller 206 may transmit a compute operation request to the compute service 208 requesting a boot volume replacement be performed for the node. The boot volume replacement request may include the node identifier. The boot volume replacement request may include the bootstrap token to be transmitted to the node. The bootstrap token may be transmitted to the node to be include in metadata for the node. The compute service 208 may record the compute operation request and wait for the compute operation request to finish before transmitting a response at step S332.

In certain embodiments, the node operation controller 206 may generate and transmit a request for compute instance (e.g., node) details. The request may include the node identifier for the node targeted by the request. The node may be the node that the maintenance request is directed toward. The request for the compute instance may be transmitted to the compute service 208 to determine the status of the node maintained by the compute service 208 (e.g., the cloud provider infrastructure). The compute service 208 may determine whether the node is busy or can be worked on. The compute service 208 may transmit a compute instance request response to the node operation controller 206.

At step S332, the node operation controller 206 may receive an indication from the compute service 208 that the boot volume replacement requested for the node at step S330 has been performed, is being performed, and/or has failed, etc. The indication may indicate whether the node has rejoined the cluster (e.g., after the boot volume replacement was successfully completed, after the boot volume replacement was aborted because of a timeout, etc.).

In certain embodiments, the node operation controller 206 may use the indication from the compute service 208 to update the node action request status stored by the node cell data store 204 (e.g., to indicate whether the work request has finished). The indication from the compute service 208 may indicate whether the compute operation request finished. In certain embodiments, responsive to receiving the indication from the computer service 208, the node operation controller 206 may request a status of the node from the API server 118. The status may indicate whether the node has rejoined the cluster (e.g., after the boot volume replacement was successfully completed, after the boot volume replacement was aborted because of a timeout, etc.).

At step S334, the node operation controller 206 may transmit a third node operation request to the API server 118. The third node operation request may instruct the API server 118 to uncordon the node. The node may be uncordoned because the boot volume replacement was successful and therefore the node can be used with the requested node configuration. The node may be uncordoned because a previous step was not successfully performed so the node is uncordoned so it can be used with the current node configuration.

At step S336, the API server 118 may transmit a node readiness status to the node operation controller 206. The node may be ready if the node has been registered back to the cluster and/or uncordoned.

At step S338, the node operation controller 206 may transmit a status indication to the node cell data store 204. The node operation controller 206 may cause the node action request stored in the node cell data store 204 to be associated with the status that indicates the node has been uncordoned. The node operation controller 206 may repeat steps S314 through S338 until no further node action requests remain in the node cell data store 204 for the node operation controller 206.

At step S340, the node action controller 202 may determine that the status of the node action request has been updated to the status that indicates the node has been uncordoned and/or that the node ran into an error. The node action controller 202 may make the determination by listening for changes to the node cell data store 204 or by periodically checking for updates to the node action request status.

At step S342, the node action controller 202 may receive the status of the node action request from the node cell data store 204 (e.g., in response to the determination made in step S342, after requesting the status, etc.).

At step S344, the node action controller 202 may transmit the status to the control data store 120 to cause the maintenance request status to be updated in the control data store 120. The updated maintenance request status may indicate that the maintenance request for the associated node was completed.

At step S346, the cluster manager 112 may determine that the status of the node maintenance request has been updated to the status that indicates the node maintenance request has finished (e.g., with success or failed). The cluster manager 112 may make the determination by listening for changes to the control data store 120 or by periodically checking for updates to the node maintenance request status.

At step S348, the control data store 120 may transmit the status indication for the node maintenance request to the cluster manager 112. The status indication may be transmitted based on a request (e.g., a pull request) made by the cluster manager 112 at step S348.

At step S350, the cluster manager 112 may transmit the status indication of the node maintenance request to the service provider API 116. The service provider API 116 may transmit the status indication to a tenant client or another component that transmitted the node maintenance request at step S302.

Some examples scenarios are described below. In an example, a tenant client submits a node maintenance request to replace boot volume or reboot the node identified by the node maintenance request. The node maintenance request may be submitted to the cluster manager 112 while there is an in-flight node action for the node (e.g., a replace boot volume or reboot node maintenance request already stored by the control data store 120 for the node). The cluster manager 112 may reject the node maintenance request and indicate that the request was rejected because another request associated with the node is already in progress.

In an example, a tenant client submits a node maintenance request (e.g., to cause a replace boot volume request) and a destructive cycling node pool request. The node maintenance request and the destructive cycling node pool request may be received and accepted by the cluster manager 112. The cluster manager 112 may insert the two different requests (e.g., works requests) into the control data store 120, that each correspond with the respective request. The node maintenance request and the destructive cycling node pool request may be processed in parallel. If the node indicated by the destructive cycling node pool request is the same node as the node indicated by the node maintenance request, a status of the node maintenance request may have a canceled state assigned by the cluster manager 112 or the node action controller 202 because the node will be gone after the destructive cycling node pool request. If the node indicated by the destructive cycling node pool request is not the same node as the node indicated by the node maintenance request, the node maintenance request may impact node pool capacity, the node action controller 202 may accommodate both of the node maintenance requests store by the control data store 120.

In an example, the tenant client submits a node maintenance request (e.g., to cause a replace boot volume) and a non-destructive cycling node pool request. The cluster manager 112 may receive and accept the node maintenance request and the non-destructive cycling node pool request. The cluster manager 112 may insert each of the requests into the control data store 120 and both of the requests can be processed in parallel. If the node identifier with the node maintenance requests is not the same node identified as the non-destructive cycling node pool request, the node action request may impact node pool capacity, the node action controller 202 accommodate both of the node maintenance requests store by the control data store 120.

In an example, a tenant client submits a node maintenance request (e.g., to cause a replace boot volume) and a delete node request for the same node. If node deletion request is received by the cluster manager 112 first, the cluster manager 112 may reject node action request. If the node maintenance request is received by the cluster manager 112 first, the node action controller 202 may cancel the node action request and then cause the node to be deleted.

In an example, the tenant client submits a delete node pool request to the cluster manager 112 via the service provider API 116. The cluster manager 112 may may cause all in-flight node actions (e.g., the node maintenance requests) of the nodes in the node pool to be canceled, and then deletes the nodes. The in-flight node actions may be caused to be canceled by updating the status of a node maintenance request stored by the control data store and/or updating the status of a node action request stored by the node cell data store 204.

In an example, the tenant client submits a node maintenance request (e.g., to cause a replace of a node boot volume) and creates a node pool request. The cluster manager 112 may accept both request and return (and/or maintain) two status indications, each indicating a status of the respective request. The node maintenance request can be processed in parallel with node pool create operation.

In an example, a tenant client submits a node maintenance request (e.g., a request causing a replace boot volume) and an update node pool request. The cluster manager 112 may receive the requests via the service provider API 116. The cluster manager 112 may accept both of the requests and transmit the request to the control data store 120. The cluster manager 112 may return the status of each request to the service provider API 116 based on status updated stored in the control data store 120. The node maintenance request can be processed in parallel with the node pool update operation when the node pool update operation does not impact existing nodes. If a node pool update request results in termination of a node, any in-flight node maintenance request for the node may be canceled using techniques as described above.

In an example, a cluster manager 112 detects a change on a node pool for reconciliation while there is an in-flight node maintenance request. If the change indicates a termination of the node, the cluster manager 112 may cancel any in-flight node maintenance request for the node.

Embodiments described offer several benefits. Certain embodiments can enable the node to be maintained while the node maintenance request is being carried out. The node object can persist even though it's under repair and the node object may seamlessly be joined back with the cluster after the node maintenance request is complete.

Figure 4:
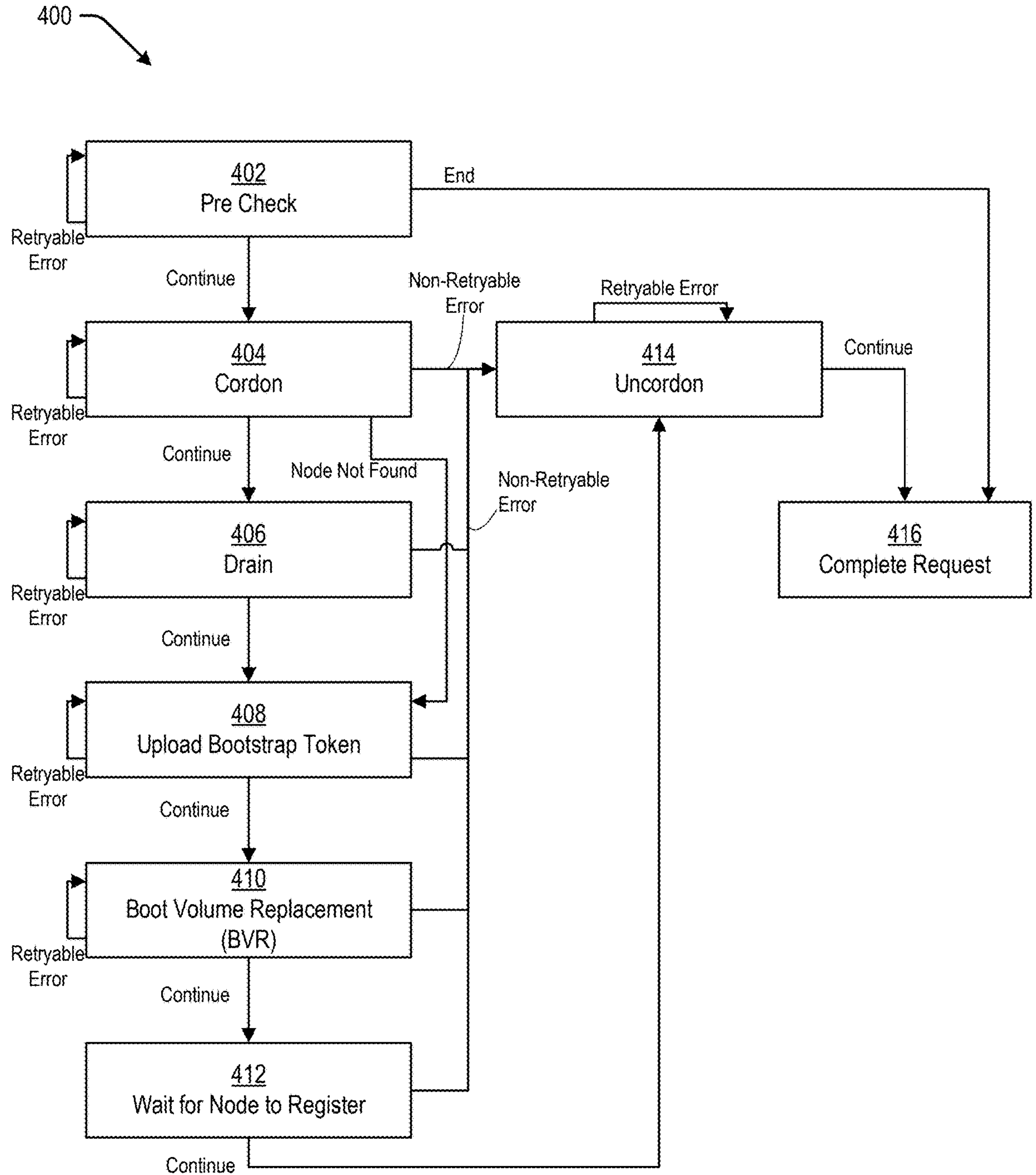
FIG. 4 is a block diagram illustrating an example method performed by a node operation controller to update a node, in accordance with at least one embodiment.

FIG. 4 is a block diagram 400 illustrating an example method performed by a node operation controller (e.g., node operation controller 206 described above), in accordance with at least one embodiment. The node operation controller may perform the method after receiving a node action request from a node cell data store (e.g., node cell data store 204). The node action request may include a cluster identifier to identify a cluster to update, a node pool identifier to identify one or more nodes to update, a node identifier to identify a node to update, a cycle mode indication, a scope, and/or a requested node configuration.

At step S402, the node operation controller may perform a pre-check. The pre-check can determine whether the node identified by the node identifier included in the node action request has a current configuration that is different from the requested node configuration. The current configuration may be different if one or more properties included in the current configuration are not included in the requested node configuration or if one or more properties included in the requested node configuration are not included in the current configuration. The current configuration may be different if a first parameter (e.g., a value) assigned to a first property of the current configuration is different from a second parameter assigned to the first property of the requested node configuration. In certain embodiments, a subset of properties and/or parameters associated with the properties are compared between the current configuration and the requested node configuration. The subset of properties may include, but may not be limited to, a version property, a node metadata property, a boot volume size in GBs property, an image Id property, and/or a SSH public key property. The subset of parameters may include the values assigned to the respective properties.

If the pre-check step fails to be performed. The failure may be classified as a retriable error. For example, a retriable error may be an error that causes the step to be performed again. The retriable error may occur if a resource is busy a network issue occurs, or another error occurs with performing the step. The retriable error may cause an error counter to be incremented. The step may be performed after a retriable error occurs if the error counter is below a predefined value (e.g., retry 3 times). After a retriable error, the step may be performed again after a period of time has passed. For example, the step may be performed again after ten seconds to pass in an effort to enable resource, network, or another issue that causes the retriable error to be resolved. After a retriable error, if the error counter has reached the predefined value, the step may not be performed again, and the error may then be a non-retriable error. The non-retriable error may cause step S416 to be performed. In certain embodiments, an error may be classified as a non-retriable error before the step is performed again.

If the pre-check step determines that the current configuration is different from the requested node configuration, the method performed by the node operation controller may end because the node configuration does not need to be updated with the requested node configuration since they are not determined to be different. In the case that the current configuration is not different from the requested node configuration, the method with continue with step S416.

If the pre-check step determines that the current configuration is different from the requested node configuration, the step may successfully be performed and the node operation controller may perform step S404

At step S404, the node operation controller may perform a cordon operation on the node. Cordoning the node can mark the node as unschedulable to prevent new pods from being scheduled on the node. Existing pods on the node can continue running. Cordoning the node can prepare the node for maintenance (e.g., rebooting, a boot volume replacement, updating the current configuration with the requested node configuration) without disrupting current workloads of the node. Cordoning the node may be caused by the node operation controller generating and transmitting a node operation request to an API server (e.g., API server 118) that includes the node identifier and an indication to cordon the node.

In some cases, the node operation controller may receive an indication that the cordon operation failed. The indication that the cordon operation failed may be received from the API server and be based on the node operation request. The cordon operation may have failed because of a network error, an incorrect node identifier, insufficient permissions, and/or an API server issue, etc. The indication that the cordon operation failed may be indicative of a retriable error (e.g., like the retriable error described above) and step S404 may be performed again. The indication that the cordon operation failed may be indicative of a non-retriable error (e.g., because step has been retried a predefined number of times and the error has not resolved). The non-retriable error at step S404 may cause the method to continue with uncordoning the node at step S414.

If the cordon operation is performed successfully (e.g., as indicated by the API server), the method may continue to step S406.

At step S406, the node operation controller may perform a drain operation on the node. Draining the node may evict running pods (e.g., all running pods) from the node before marking it as unschedulable. Draining the node can be used to reschedule workloads on other nodes and be used when performing maintenance that required the node to be empty. Draining the node may be caused by the node operation controller generating and transmitting a node operation request to the API server. The node operation request may include the node identifier and an indication to drain the node.

In some cases, the node operation controller may receive an indication that the drain operation failed. The indication that the drain operation failed may be received from the API server and be based on the node operation request. The drain operation may have failed because of a network error, an incorrect node identifier, insufficient permissions, and/or an API server issue, etc. The indication that the drain operation failed may be indicative of a retriable error (e.g., like the retriable error described above) and step S406 may be performed again. The indication that the drain operation failed may be indicative of a non-retriable error (e.g., because step has been retried a predefined number of times and the error has not resolved). The non-retriable error at step S406 may cause the method to continue with uncordoning the node at step S414.

If the drain operation is performed successfully (e.g., as indicated by the API server), the method may continue to step S408.

At step S408, a bootstrap token (e.g., the bootstrap token described herein) may be generated and uploaded to the node. Generating and uploading the bootstrap token is described in further detail with respect to S328 of FIG. 3, above.

In some cases, generating and/or uploading the bootstrap token fails. The bootstrap token generation and/or upload may fail because of a network error, an incorrect node identifier, insufficient permissions, and/or an API server issue, etc. The indication that the bootstrap token generation and/or upload failed may be indicative of a retriable error (e.g., like the retriable error described above) and step S408 may be performed again. The indication that the bootstrap token generation and/or upload failed may be indicative of a non-retriable error (e.g., because step has been retried a predefined number of times and the error has not resolved). The non-retriable error at step S408 may cause the method to continue with uncordoning the node at step S414.

If the bootstrap token is generated and uploaded to the node successfully, the method may continue to step S410.

At step S410, the node operation controller may perform a boot volume replacement on the node. The boot volume replacement may replace a root disk (e.g., a boot volume) of the node. The boot volume replace may be caused by the node operation controller generating and transmitting a compute operation request to a compute service (e.g., compute service 208). The compute operation request may include the node identifier and an indication to perform the boot volume replacement.

In some cases, the node operation controller may receive an indication that the boot volume replacement operation failed. The indication that the boot volume replacement operation failed may be received from the compute service and be based on the compute operation request. The compute operation request and/or the boot volume replacement may have failed because of a network error, an incorrect node identifier, insufficient permissions, and/or an compute service issue, etc. The indication that the compute operation failed may be indicative of a retriable error (e.g., like the retriable error described above) and step S410 may be performed again. The indication that the compute operation failed may be indicative of a non-retriable error (e.g., because step has been retried a predefined number of times and the error has not resolved). The non-retriable error at step S410 may cause the method to continue with uncordoning the node at step S414.

If the compute operation (e.g., to perform the boot volume replacement) is performed successfully (e.g., as indicated by the compute service), the method may continue to step S412.

At step S412, the node operation controller may wait for the node to register with the cluster. The node may register (e.g., join) with the cluster after the boot volume replacement is successfully performed. The node may register with the cluster using the bootstrap token. The node operation controller may be notified by the compute service when the node registers. In certain embodiments, the node operation controller polls the API server to determine that the node is registered.

In some cases the node may wait for the node to register for a predefined period of time (e.g., 20 minutes). In some embodiments, if the node does not register within the period of time, the method continues with uncordoning the node at step S414. After the node registers, the method may continue to step S414.

At step S414, the node operation controller may perform an uncordon operation on the node. Uncordoning the node can mark the node as schedulable to enable new pods to be scheduled on the node. Uncording the node may be caused by the node operation controller generating and transmitting a node operation request to the API server that includes the node identifier and an indication to uncordon the node.

In some cases, the node operation controller may receive an indication that the uncordon operation failed. The indication that the uncordon operation failed may be received from the API server and be based on the node operation request. The uncordon operation may have failed because of a network error, an incorrect node identifier, insufficient permissions, and/or an API server issue, etc. The indication that the uncordon operation failed may be indicative of a retriable error (e.g., like the retriable error described above) and step S414 may be performed again. The indication that the uncordon operation failed may be indicative of a non-retriable error (e.g., because step has been retried a predefined number of times and the error has not resolved). The non-retriable error at step S4014 may cause the method to continue to step S416 to indicate that the node action request has not been completed and the indication that the node action request has not been completed may include a reason why.

If the uncordon operation is performed successfully (e.g., as indicated by the API server), the method may continue to step S406 to indicate that the node action request has been completed.

At step S416, the node action controller may transmit a status to the node cell data store. The status may be transmitted with the node identifier associated with the status and/or an indication of the node action request identifier that caused the node operation controller to perform steps S402-416. The status may indicate whether the node action request was performed, whether the node action requests was performed successfully, what caused the node action request to not be performed successfully.

Figure 5:
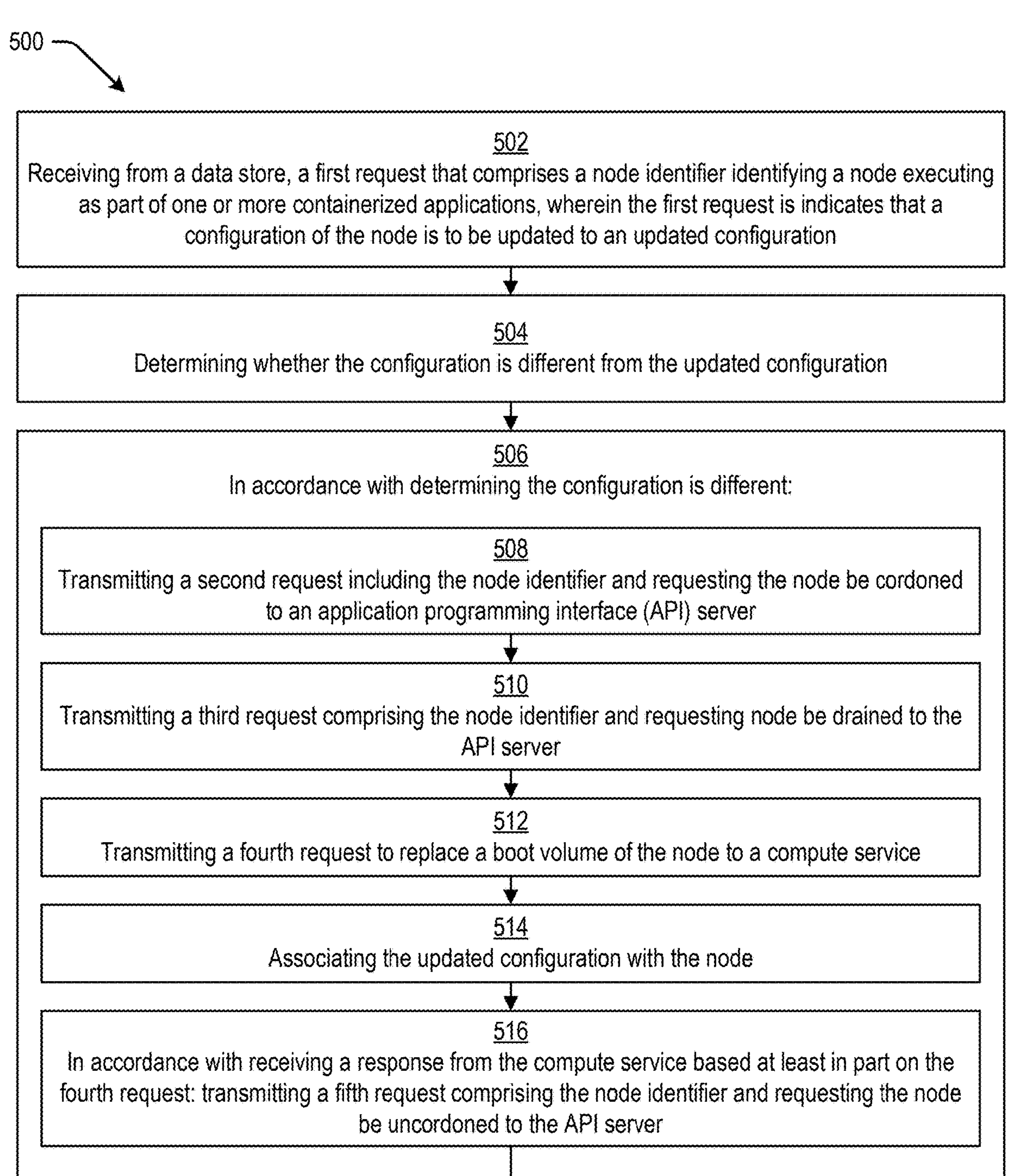
FIG. 5 is a block diagram illustrating an example method for updating a node, in accordance with at least one embodiment.

FIG. 5 is a block diagram 500 illustrating an example method for updating a node, in accordance with at least one embodiment. The method may be performed by a node operation controller (e.g., node operation controller 206 described above). Further, the node being updated may be updated independent of deleting the node (e.g., without deleting the node).

At step S502, the node operation controller may receive a first request. The first request may be received from a data store (e.g., node cell data store 204 described above). The first request may include a node identifier that identifies a node. The node identifier may uniquely identify the node in the cluster from any other nodes includes in the cluster. The node may be executing as part of one or more containerized applications. The first request may include an indication that a current configuration of the node is to be updated to an updated configuration. The node configuration can include properties and parameters applied to the node (e.g., a physical or virtual machine) within the cluster, defining the node's available resources like CPU, memory, storage, and other operational aspects like networking and container runtime settings. The configuration file may include the following properties but is not limited to the following properties: a version property (e.g., a kubernetesVersion property), a node Meta data property, a boot volume size in Gigabytes (GBs)

property, an image identifier property, and/or a SSH public key property. The properties may be associated with a respective parameter (e.g., a value). For example, a parameter associated with the version property may be "1.0" to indicate a version number. The first request may indicate to update the node while maintaining the node in memory. Updating the node while maintaining the node in memory may be performed using a boot volume replacement on the node. In certain embodiments, the first request identifies more than one node for the updated configuration to be applied to.

At step S504, the node operation controller may determine whether the configuration is different from the updated configuration. The current configuration may be different if one or more properties included in the current configuration are not included in the requested updated node configuration or if one or more properties included in the requested updated node configuration are not included in the current configuration. The current configuration may be different if a first parameter (e.g., a value) assigned to a first property of the current configuration is different from a second parameter assigned to the first property of the requested updated node configuration. In certain embodiments, a subset of properties and/or parameters associated with the properties are compared between the current configuration and the requested node configuration. Determine whether the configuration is different from the updated configuration is further described with respect to steps S318 and S402 described above.

In certain embodiments, determining that the configuration is different than the updated configuration comprises determining that at least one of a first version, a first instance metadata, a first image, a first image identifier, a first boot volume size, or a first SSH key included in the configuration is different from a second version, a second instance metadata, a second image, a second image identifier, a second boot volume size, or a second SSH key that is included in the updated configuration. In certain embodiments, determining that the configuration is different than the requested updated configuration occurs before a request to cordon the node at step S508, a request to drain the node at step S510, and/or a request to replace the boot volume of the node at step S12.

At step S506, in accordance with determining the configuration is different at step S504, steps S508-516 may be performed. If it is determined that the configuration is not different than the requested updated configuration, then the method may transmit a status indicator to the data store and the status indicator may indicate that the first request was not successful (e.g., because it did not need to be performed since the configuration would not be updated by the first request).

At step S508, the node operation controller may transmit a second request to an API server (e.g., API server 118). The second request may include the node identifier. The second request may request that the node be cordoned. Step S508 may be performed in a similar manner as step S404 described above.

At step S510, the node operation controller may transmit a third request to the API server. The third request may include the node identifier. The third request may request that the node be drained. Step S510 may be performed in a similar manner as step S406 described above.

At step S512, the node operation controller may transmit a fourth request to a compute service (e.g., compute service 208 described above). The fourth request may request that a boot volume of the node be replaced (e.g., using a boot volume replace Kubernetes operation). Step S512 may be performed in a similar manner as step S410 described above.

At step S514, the node operation controller may associate the updated configuration with the node. The updated configuration may be associated with the node by transmitting the updated configuration to the node for the node to store. The updated configuration may be associated with the node in memory maintained by the cluster.

The node operation controller may wait to perform step S516 until after the node operation controller received an indication from the compute service that the boot volume replacement has been completed. At step S516, in accordance with receiving a response from the compute service based at least in part on the fourth request, the node operation controller may transmit a fifth request to the API server that requests the node to be uncordoned. The firth request may include the node identifier so that the API server knows which node to uncordon. Step S516 may be performed in a similar manner as step S414 described above.

At step S518, the node operation controller may transmit a status indicator to the data store. The status indicator may indicate that the first request was successful. For example, if steps S508-516 were successfully performed, then the status indicator may indicate that the first request was successful. Step S518 may be performed in a similar manner as step S416 described above.

If any of the above steps fail to be performed. Certain embodiments will retry to perform the step. A step may fail to perform because of network issues (e.g., network disconnection), resource issues (e.g., not enough processing resources, not enough memory resources, etc.), and/or an issue thrown by an API. Certain embodiments will wait an amount of time before trying to perform the step again. Certain embodiments will retry performing the step for a number of times before a status indicator is transmitted to the data store that indicated the first request was unsuccessful. The status indicator may indicate what error(s) occurred, why the error(s) occurred, and/or when the error(s) occurred, etc. In certain embodiments, when the step is not attempted to be performed again after one or more errors, a request indicating to uncordon the node may be transmitted to the API server so that the node can be used.

Any of the computer systems mentioned herein may utilize any suitable number of subsystems. Examples of such subsystems are shown in FIG. 2 in node maintenance system 200. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

Figure 6:
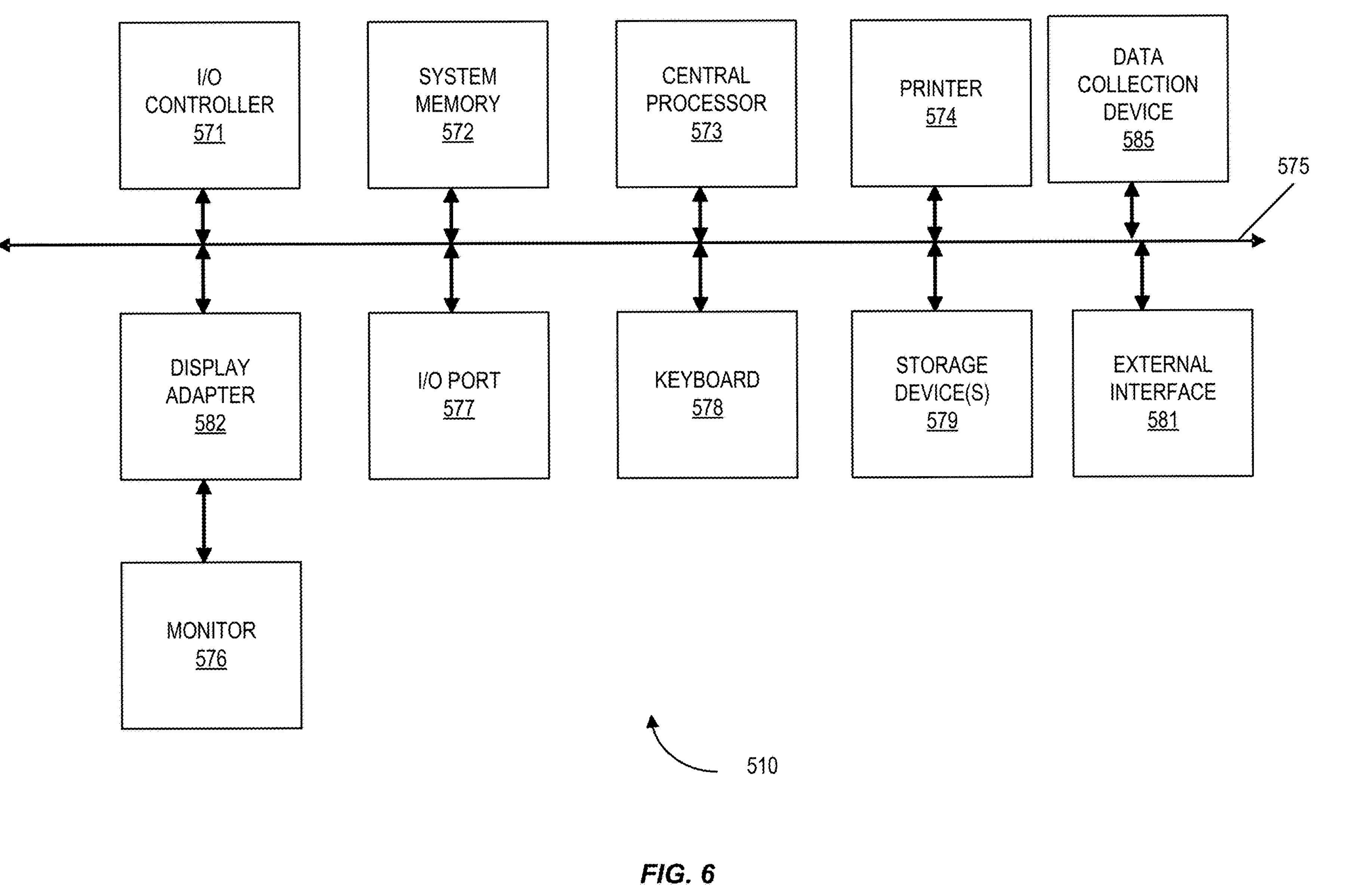
FIG. 6 shows a simplified diagram of a computer according to at least one embodiment.

The subsystems shown in FIG. 6 are interconnected via a system bus 675. Additional subsystems such as a printer 674, keyboard 678, storage device(s) 679, monitor 676 (e.g., a display screen, such as an LED), which is coupled to display adapter 682, and others are shown. Peripherals and input/output (I/O) devices, which couple to I/O controller 671, can be connected to the computer system by any number of means known in the art such as input/output (I/O) port 677 (e.g., USB, Fire Wire®). For example, I/O port 677 or external interface 681 (e.g. Ethernet, Wi-Fi, etc.) can be used to connect computer system 610 to a wide area network such as the Internet, a mouse input device, or a scanner. The interconnection via system bus 675 allows the central processor 673 to communicate with each subsystem and to control the execution of a plurality of instructions from system memory 672 or the storage device(s) 679 (e.g., a fixed disk, such as a hard drive, or optical disk), as well as the exchange of information between subsystems. The system memory 672 and/or the storage device(s) 679 may embody a computer readable medium. Another subsystem is a data collection device 685, such as a camera, microphone, accelerometer, and the like. Any of the data mentioned herein can be output from one component to another component and can be output to the user.

A computer system can include a plurality of the same components or subsystems, e.g., connected together by external interface 681, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software stored in a memory with a generally programmable processor in a modular or integrated manner, and thus a processor can include memory storing software instructions that configure hardware circuitry, as well as an FPGA with configuration instructions or an ASIC. As used herein, a processor can include a single-core processor, multicore processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such devices. In addition, the order of operations may be re-arranged. A process can be terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively coupled to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Metadata that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 806 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 710 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG.

7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 752 of FIG. 7) that can be communicatively coupled to public Internet 854 (e.g., public Internet 754 of FIG. 7). Public Internet 854 can be communicatively coupled to the NAT gateway 838 contained in the control plane VCN 816. The service gateway 836 contained in the control plane VCN 816 can be communicatively coupled to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 706 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924

(e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7).

The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively coupled to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
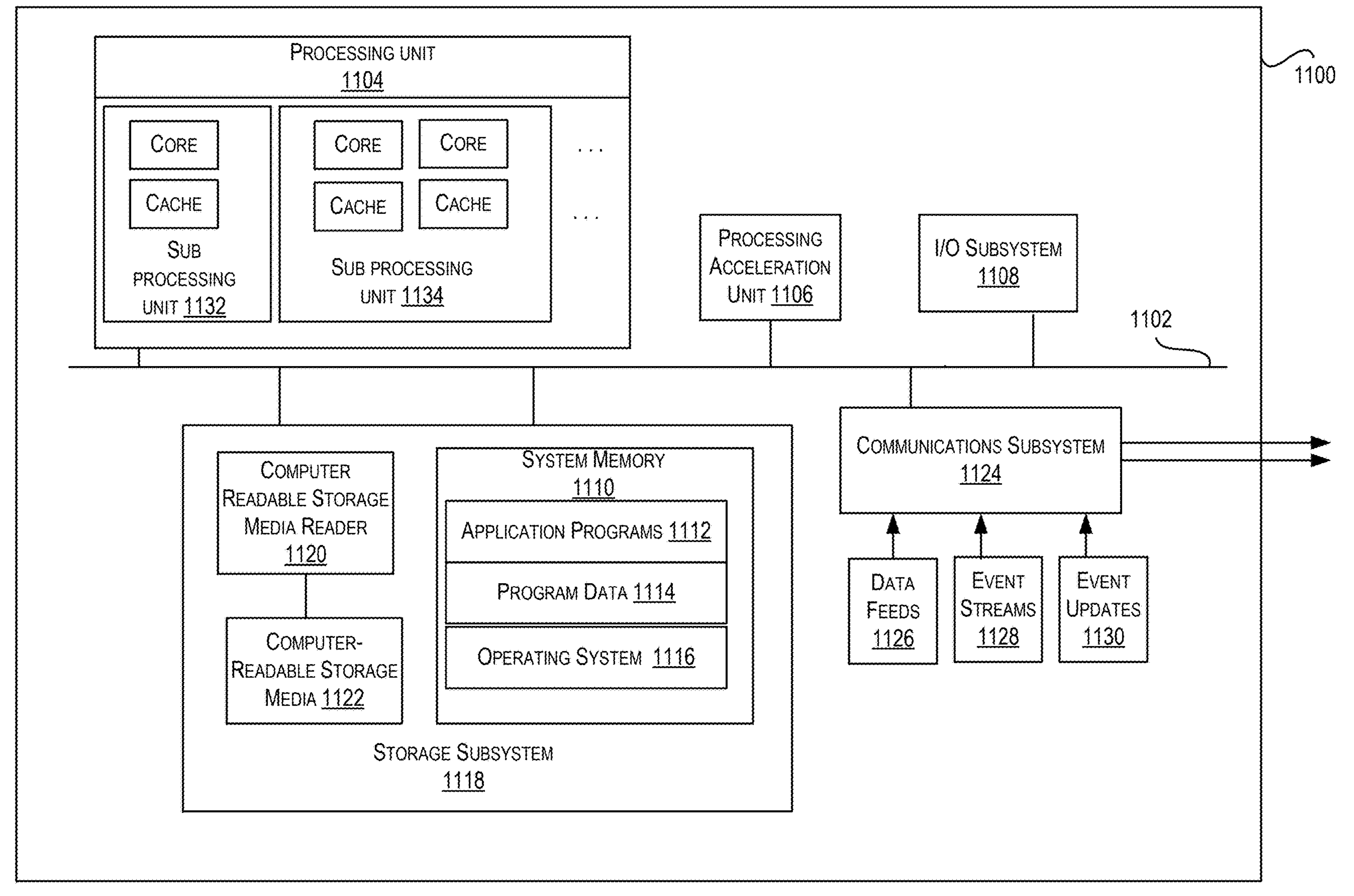
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1104 provide the functionality described above. Storage subsystem 1118 may also provide a repository for storing data used in accordance with the present disclosure.

As depicted in the example in FIG. 11, storage subsystem 1118 can include various components including a system memory 1110, computer-readable storage media 1122, and a computer readable storage media reader 1120. System memory 1110 may store program instructions that are loadable and executable by processing unit 1104. System memory 1110 may also store data that is used during the execution of the instructions and/or data that is generated during the execution of the program instructions. Various different kinds of programs may be loaded into system memory 1110 including but not limited to client applications, Web browsers, mid-tier applications, relational database management systems (RDBMS), virtual machines, containers, etc.

System memory 1110 may also store an operating system 1116. Examples of operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1100 executes one or more virtual machines, the virtual machines along with their guest operating systems (GOSs) may be loaded into system memory 1110 and executed by one or more processors or cores of processing unit 1104.

System memory 1110 can come in different configurations depending upon the type of computer system 1100. For example, system memory 1110 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1110 may include a basic input/output system (BIOS) containing basic routines that help to transfer information between elements within computer system 1100, such as during start-up.

Computer-readable storage media 1122 may represent remote, local, fixed, and/or removable storage devices plus storage media for temporarily and/or more permanently containing, storing, computer-readable information for use by computer system 1100 including instructions executable by processing unit 1104 of computer system 1100.

Computer-readable storage media 1122 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Machine-readable instructions executable by one or more processors or cores of processing unit 1104 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:

receiving, by a node operation controller and from a data store, a first request that comprises a node identifier identifying a node executing as part of one or more containerized applications, wherein the first request indicates that a configuration of the node is to be updated to an updated configuration;

determining, by the node operation controller, whether the configuration is different from the updated configuration;

in accordance with determining the configuration is different:

transmitting, by the node operation controller, a second request including the node identifier and requesting the node be cordoned to an application programming interface (API) server;

transmitting, by the node operation controller, a third request comprising the node identifier and requesting the node be drained to the API server;

transmitting, by the node operation controller, a fourth request to replace a boot volume of the node to a compute service;

associating, by the node operation controller, the updated configuration with the node;

in accordance with receiving a response from the compute service based at least in part on the fourth request:

transmitting, by the node operation controller, a fifth request comprising the node identifier and requesting the node be uncordoned to the API server; and transmitting, by the node operation controller, a status indicator to the data store to indicate that the first request was successful.

2. The method of claim 1, wherein the node is updated independent of deleting the node.

3. The method of claim 1, wherein determining that the configuration is different than the updated configuration occurs before the second request, the third request, and the fourth request.

4. The method of claim 1, wherein the first request comprises an indication to update the node while maintaining the node in a memory.

5. The method of claim 1, wherein the first request comprises a plurality of node identifiers that includes the node identifier.

6. The method of claim 1, wherein determining that the configuration is different than the updated configuration comprises determining that at least one of a first version, a first instance metadata, a first image, a first image identifier, a first boot volume size, or a first SSH key included in the configuration is different from a second version, a second instance metadata, a second image, a second image identifier, a second boot volume size, or a second SSH key that is included in the updated configuration.

7. The method of claim 1, further comprising:

after receiving an indication of an error associated with determining that the configuration is different than the updated configuration, performing the second request, performing the fourth request, or performing the fifth request:

determining, by the node operation controller, whether the configuration is different from the updated configuration;

transmitting, by the node operation controller, a sixth request including the node identifier and requesting the node be cordoned to the API server;

transmitting, by the node operation controller, a seventh request including the node identifier and requesting the node be drained to the API server; or transmitting, by the node operation controller, an eight request including the node identifier and requesting the node be uncordoned to the API server, respectively.

8. The method of claim 1, further comprising:

after receiving an indication of an error associated with determining that the configuration is different than the updated configuration, performing the second request, performing the fourth request, or performing the fifth request:

transmitting, by the node operation control, the fifth request to the API server.

9. A service provider computing system comprising:

one or more memories; and one or more processors in communication with the one or more memories and configured to execute instructions stored in the one or more memories to perform operations comprising:

receiving, from a data store, a first request that comprises a node identifier identifying a node executing as part of one or more containerized applications, wherein the first request indicates that a configuration of the node is to be updated to an updated configuration;

determining whether the configuration is different from the updated configuration;

in accordance with determining the configuration is different:

transmitting a second request including the node identifier and requesting the node be cordoned to an application programming interface (API) server;

transmitting a third request comprising the node identifier and requesting the node be drained to the API server;

transmitting a fourth request to replace a boot volume of the node to a compute service;

associating the updated configuration with the node;

in accordance with receiving a response from the compute service based at least in part on the fourth request:

transmitting a fifth request comprising the node identifier and requesting the node be uncordoned to the API server; and transmitting a status indicator to the data store to indicate that the first request was successful.

10. The service provider computing system of claim 9, wherein executing the instructions execute stored in the one or more memories causes the one or more processors to perform operations further comprising:

in accordance with determining the configuration is different:

transmitting a second status indicator to the data store to indicate that the first request was unsuccessful.

11. The service provider computing system of claim 9, wherein the node is updated independent of deleting the node.

12. The service provider computing system of claim 9, wherein determining that the configuration is different than the updated configuration occurs before the second request, the third request, and the fourth request.

13. The service provider computing system of claim 9, wherein the first request comprises an indication to update the node while maintaining the node in a memory and a plurality of node identifiers that includes the node identifier.

14. The service provider computing system of claim 9, wherein determining that the configuration is different than the updated configuration causes the one or more processors to perform operations comprising:

comprises determining that at least one of a first version, a first instance metadata, a first image, a first image identifier, a first boot volume size, or a first SSH key included in the configuration is different from a second version, a second instance metadata, a second image, a second image identifier, a second boot volume size, or a second SSH key that is included in the updated configuration.

15. The service provider computing system of claim 9, wherein executing the instructions execute stored in the one or more memories causes the one or more processors to perform operations further comprising:

after receiving an indication of an error associated with determining that the configuration is different than the updated configuration, performing the second request, performing the fourth request, or performing the fifth request:

transmitting, to the API server, the fifth request.

16. A non-transitory computer-readable medium storing a plurality of instructions that, when executed by one or more processors of a service provider computing system, cause the one or more processors to perform operations comprising:

receiving, from a data store, a first request that comprises a node identifier identifying a node executing as part of one or more containerized applications, wherein the first request indicates that a configuration of the node is to be updated to an updated configuration;

determining whether the configuration is different from the updated configuration;

in accordance with determining the configuration is different:

transmitting a second request including the node identifier and requesting the node be cordoned to an application programming interface (API) server;

transmitting a third request comprising the node identifier and requesting the node be drained to the API server;

transmitting a fourth request to replace a boot volume of the node to a compute service;

associating the updated configuration with the node;

in accordance with receiving a response from the compute service based at least in part on the fourth request:

transmitting a fifth request comprising the node identifier and requesting the node be uncordoned to the API server; and transmitting a status indicator to the data store to indicate that the first request was successful.

17. The non-transitory computer-readable medium of claim 16, wherein the node is updated independent of deleting the node.

18. The non-transitory computer-readable medium of claim 16, wherein determining that the configuration is different than the updated configuration occurs before the second request, the third request, and the fourth request.

19. The non-transitory computer-readable medium of claim 16, wherein the first request comprises an indication to update the node while maintaining the node in a memory and a plurality of node identifiers that includes the node identifier.

20. The non-transitory computer-readable medium of claim 16, wherein determining that the configuration is different than the updated configuration causes the one or more processors to perform operations comprising:

comprises determining that at least one of a first version, a first instance metadata, a first image, a first image identifier, a first boot volume size, or a first SSH key included in the configuration is different from a second version, a second instance metadata, a second image, a second image identifier, a second boot volume size, or a second SSH key that is included in the updated configuration.

* * * * *